Nov. 15, 1927.
H. J. WINCH
1,649,050
VARIABLE GEAR
Filed Sept. 16, 1925
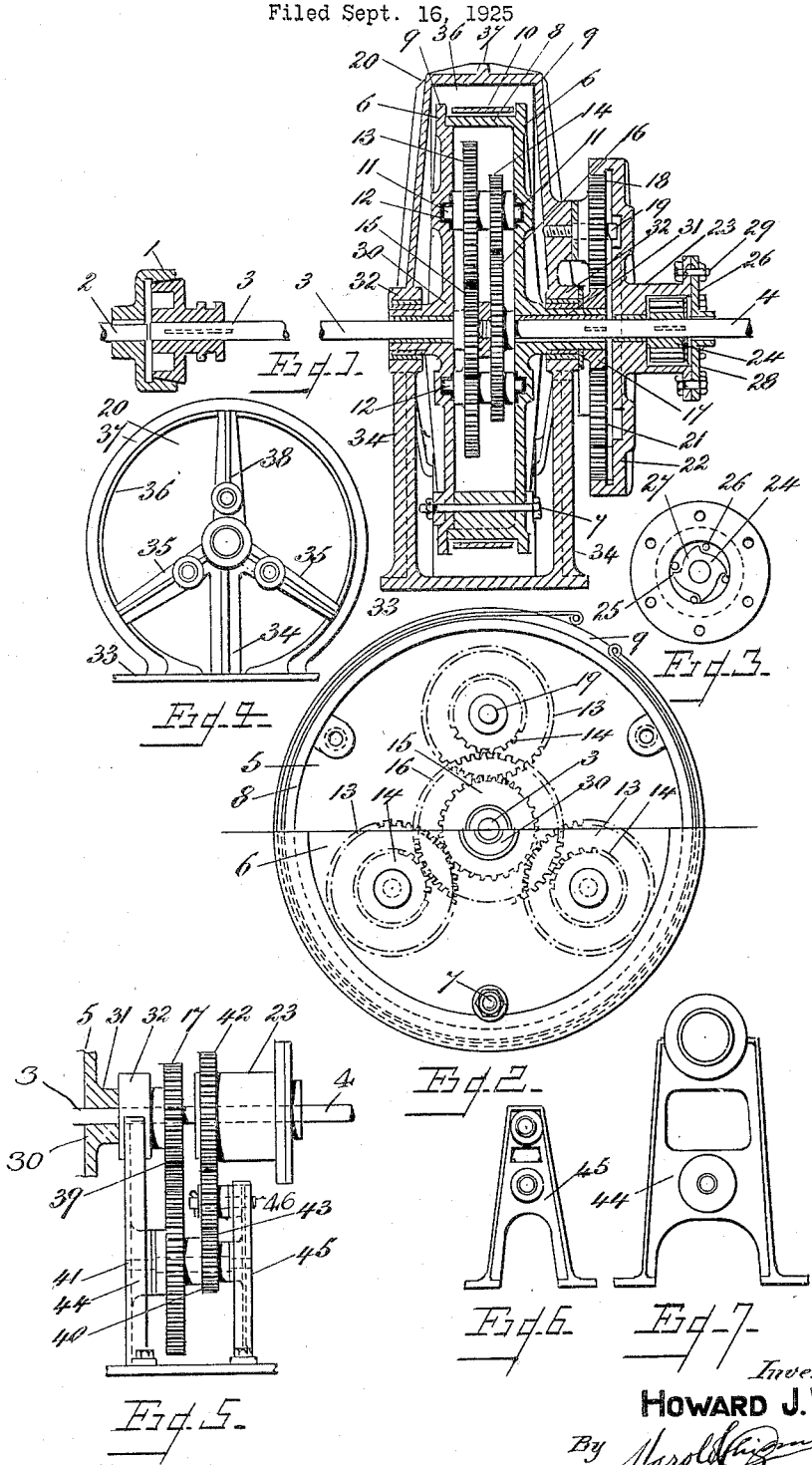
Inventor
HOWARD J. WINCH Patented Nov. 15, 1927.

1,649,050

UNITED STATES PATENT OFFICE.

HOWARD JAMES WINCH, OF SHIVRAJPUR, INDIA.

VARIABLE GEAR.

Application filed September 16, 1925, Serial No. 56,683, and in Great Britain September 16, 1924.

The object of this invention is to provide a variable gear designed especially for use in combination with oil engines and more particularly engines of moderate power employed for hauling purposes; the gear being, however, applicable to other uses.

The invention consists more particularly in the provision, for the purpose above referred to, of a gear by which high and low speeds can be imparted to a driven shaft gradually, from one to the other, without any of the mechanism being, even momentarily, out of gear by merely tightening or loosening a brake-band carried by a revoluble gear casing or drum after the gear has been put into operation by means of a clutch on or connected to the engine shaft.

Further, the invention consists in the particular combination of parts herein described and set forth in the appended claiming clauses.

Further, the invention consists in a combination with said gear of a stationary fixture or support for the gear which may also constitute a protective casing for the moving parts.

Further, the invention consists in a modified arrangement of the gear wheels which are brought into operation when slow rotation of the driven shaft is required.

Reference being had to the drawings herewith:—

Fig. 1 is a vertical section through the gear.

Fig. 2 is a face view of the revoluble gear casing drum; with the upper half of the detachable side removed.

Fig. 3 is a front view of the "one-way" clutch having the cover removed.

Fig. 4 is a front view of the fixed necessary support, forming part of the gear and, if desired, a protective casing.

Fig. 5 is a view in elevation, illustrating an alternative arrangement of gear wheels which impart rotation, at low speed, to the driven shaft.

Figs. 6 and 7 are, respectively, front views of bearing supports shown in Fig. 5.

The gear comprises a clutch 1, of any suitable construction, adapted to connect the engine shaft 2 with a driven shaft 3 constituting the driving shaft of the gear. The shaft 3 and a shaft 4 carry a revoluble gear casing 5 which may be of the type known as a "spider" or, as shown, may comprise an annular gear box having a suitable closure 6 capable of being secured in place by bolts 7. The sides of the box project beyond the annular wall 8 to constitute flanges 9 for retaining in place a flexible brake-band 10, provided with any suitable means (not shown) for tightening it around the gear casing.

The casing 5 and its cover 6 have oppositely arranged bearings 11 to accommodate shafts 12 each carrying two wheels 13 14. Each wheel 13 constitutes a planet wheel, gearing with a sun-wheel 15 carried by the shaft 3 whilst each wheel 14 constitutes a planet wheel to the sun-wheel 16 carried by the shaft 4.

The boss 31 of the gear case 5 is elongated and carries and has keyed to it a wheel 17 meshing with wheels 18 running loosely upon stub-shaft 19 held in any suitable fixture, in the present instance, the support 20. Each wheel 18 engages teeth 21 arranged within a wheel 22, loosely mounted upon a shaft 4 and formed with a clutch casing 23 constituting part of any suitable clutch of the type which will bind with a shaft when turned in one direction, but will run freely around the shaft when turned in the opposite direction. In the present instance, the clutch consists of the casing 23 within which, and keyed to the shaft 4 is the cam-wheel 24 having grooves 25 in which are rollers 26 and inclined cam surfaces 27. The clutch casing has a cover 28 secured thereto by bolts 29. In the construction shown, the bosses 30 and 31 of the gear case each constitute a trunnion journalled in a bearing 32 of the fixed support 20. The support may comprise a base 33 adapted to be bolted to any immovable structure such as, for instance, a bracket on the engine bed. The base has uprights 34, radially disposed arms 35 having bosses to retain the stub-shafts 19, and an annular band 36, to connect said arms, and strengthening ribs 37 and 38.

In a modified construction, the wheel 17 meshes with a wheel 39, integral with a wheel 40, or keyed to its shaft 41 to rotate with the wheel 40 which, in such instances, would be keyed to the shaft. Alternatively, both wheels, if united, may run loosely upon the shaft. The wheel 40 imparts motion to the toothed annular portion 42 of the clutch casing 23, through an intermediately situated pinion 43. The shaft 3 is supported as described with reference to Fig. 1, and the trunnion 30 may be supported by any suitable standard or fixture 44 instead of the casing support 20, shown in Fig. 1. The fixture 44 also provides a bearing support for one end of the shaft 41 of which the other end may be supported by any suitable means such as a standard or fixture 45, designed to provide also a bearing for the stub-shaft 46. The shaft 4 may run in bearings arranged in any suitable manner such, for instance, as additional standards 44.

The operation of the gear is as follows:—

The clutch having been let in to connect the shafts 2 and 3 and it being assumed that the band 10 has been loosened about the casing 5, the action of the wheels is as follows:—

The wheel 15 meshing with the wheels 13 causes them and the casing 5 to revolve about it in an opposite direction the wheels 14 likewise running around the wheels 16. The wheel 17 revolving with the gear casing 5, imparts rotation to the wheels 18 in an opposite direction to its own rotation and these wheels drive the wheel 22 in the same direction as they, themselves, revolve, being the same direction as that imparted to the shaft 3. The wheel 22 drives the shaft 4 through the clutch casing 23 and the cam 24.

The operation of the gears shown in Fig. 5, is approximately the same. The wheel 17, rotating in the same direction as the gear casing 5 imparts rotation to the wheels 39 and 40 in an opposite direction; the intermediately situated pinion 43 causing the toothed clutch drum 23 to rotate in the same direction as the shafts 2 and 3, the motion being imparted to the shaft 4 through the cam wheel 24 (Fig. 1).

To impart high speed to the shaft 4, the brake band 10 is slowly tightened about the gear casing 5 to gradually arrest its motion and consequently that of the wheels 17, 18, 22 and clutch casing 23.

The wheel 15 imparts rotation to the planet wheels 13 and 14 in an opposite direction, and the wheel 14 drives the wheel 16 and the shaft 4 in the same direction as the shaft 3: the shaft 4 and cam 24 turning freely within the casing 23.

The same method of operating the gear applies when the arrangement of wheels shown in Fig. 5 is employed.

What I claim is:—

1. In a variable gear, a driving shaft, a driven shaft in alignment with the driving shaft, a gear-case revoluble on said driving and driven shafts, a stationary support in which the gear-case is revolubly mounted, a sun-wheel fast on said driving shaft, counter-shafts revolubly mounted in the revoluble gear-casing, planet-wheels fast on the counter-shafts and meshing with the aforesaid sun-wheel, a second planet-wheel on each of said counter-shafts, a sun-wheel mounted on the driven-shaft and in mesh with the aforesaid second planet-wheels, a gear-wheel fast on and concentric with the gear-casing and revoluble therewith, a clutch on the driven-shaft, and gear-wheels intermediate the aforesaid gear-wheel on the revoluble casing and the aforesaid revoluble clutch, and a brake-band encompassing the aforesaid revoluble gear-casing.

2. In a variable gear, a driving shaft, a driven shaft in alignment with the driving shaft, a gear-case revoluble on said driving and driven shafts, a stationary support in which the gear-case is revolubly mounted, a sun-wheel fast on said driving shaft, counter-shafts revolubly mounted in the revoluble gear-casing, planet-wheels fast on the counter-shafts and meshing with the aforesaid sun-wheel, a second planet-wheel on each of said counter-shafts, a sun-wheel mounted on the driven shaft and in mesh with the aforesaid second planet-wheels, a gear-wheel fast on and concentric with the gear-casing and revoluble therewith, stub-shafts projecting from the aforesaid stationary support, gear-wheels on said stub-shafts and gearing with the aforesaid gear-wheel on the gear-casing, an internally toothed wheel loose on the driven shaft and meshing with the wheels on the aforesaid stub-shafts, a clutch forming part of said internally toothed wheel, and a brake-band encompassing the aforesaid revoluble gear-casing.

In testimony whereof I have signed my name to this specification.

HOWARD JAMES WINCH.